United States Patent Office 3,660,489
Patented May 2, 1972

3,660,489
NOVEL CARANONE DERIVATIVES, PERFUME COMPOSITIONS CONTAINING SAME AND PROCESS FOR THEIR PREPARATION
Dietmar Lamparsky, Wangen-Dubendorf, and Peter Schudel, Grut, near Wetzikon, Switzerland, assignors to Givaudan Corporation, Clifton, N.J.
No Drawing. Filed Oct. 2, 1968, Ser. No. 764,636
Claims priority, application Switzerland, Oct. 11, 1967, 14,296/67
Int. Cl. C07c 49/36, 49/54
U.S. Cl. 260—586 R    13 Claims

ABSTRACT OF THE DISCLOSURE

The disclosure is concerned with odorant compositions which are characterized in that they contain novel, olfactorily-desirable compounds of the general formula:

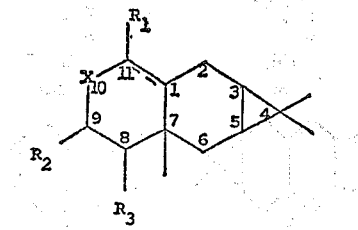

wherein $R_1$, $R_2$ and $R_3$ represent hydrogen atoms or lower alkyl groups, X signifies a CO, CHOH, CHOAc, $CH_2$ or =CH group (double bond directed towards $C_9$), Ac denoting the acyl residue of a lower alkanecarboxylic acid, and

=== signifies a C—C single or double bond.
The invention is also concerned with the novel compounds of general Formula I as well as processes for the manufacture thereof.

BACKGROUND OF THE INVENTION

Although a number of classes of olfactory-desirable chemical compounds is known, it has been found that the novel compounds of this invention possess outstanding and unexpected odorous properties making them useful in perfumery.

SUMMARY OF THE INVENTION

This invention relates to novel odorant compositions, novel chemical compounds and to a process for preparing same.

An object of this invention is to provide a new class of derivatives of caranone having utility as olfactory agents in perfumery.

A further object of this invention is to provide novel perfume compositions containing the novel caranone derivatives of this invention.

A further object is to provide a novel process for making caranone derivatives.

Other objects will become apparent to those skilled in the art from the foregoing and following description.

The novel chemicals of this invention are set forth in terms of their general formula hereinabove, under the section entitled "Abstract of the Disclosure."

DESCRIPTION OF THE PREFERRED EMBODIMENTS

Preferred compounds of general Formula I are those in which at least one of the three R-symbols signifies hydrogen, i.e. compounds wherein (a) all three R-symbols signify hydrogen, or (b) those wherein two of the R-symbols signify hydrogen and the third represents lower alkyl or (c) those wherein one of the R-symbols is hydrogen and the other two stand for lower alkyl groups.

In the present connection, by a lower alkyl group there is to be understood a straight chain or branched alkyl group containing 1–4 C-atoms, such as ethyl, propyl, isopropyl, butyl, but especially methyl.

General Formula I comprises the following preferred sub-groups:

(a) $\alpha,\beta$-unsaturated ketones of general Formula II:

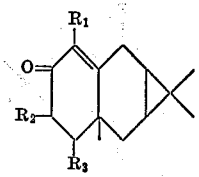

II wherein $R_1$, $R_2$ and $R_3$ have the above significance, in particular compounds of Formula IIa–IIe:

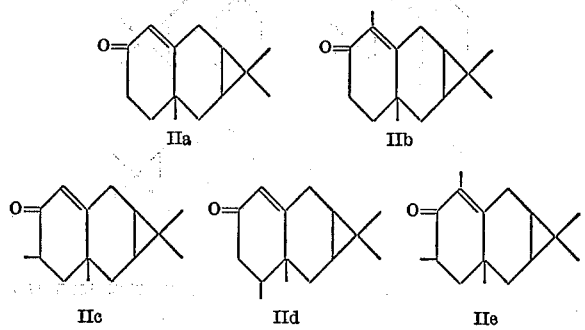

IIa    IIb

IIc    IId    IIe (b) saturated ketones of general Formula III:

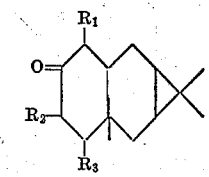

III wherein $R_1$, $R_2$ and $R_3$ have the above significance, in particular compounds of Formulae IIIa–IIId:

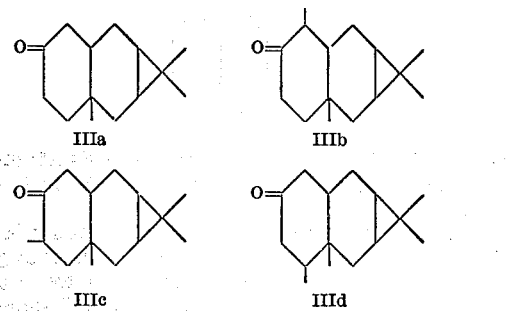

IIIa    IIIb

IIIc    IIId (c) unsaturated alcohols of general Formula IV:

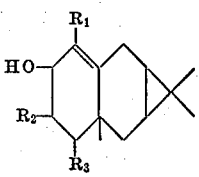

IV wherein $R_1$, $R_2$ and $R_3$ have the above significance in particular compounds of Formulae IVa–IVd:

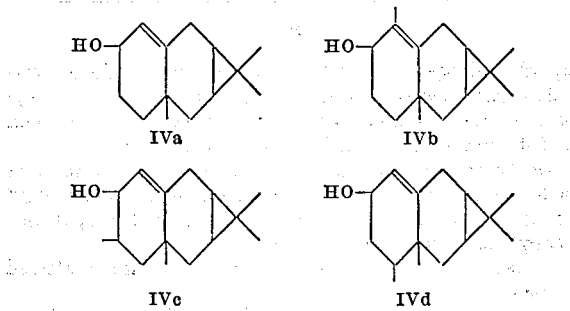

(d) unsaturated hydrocarbons of general Formula V

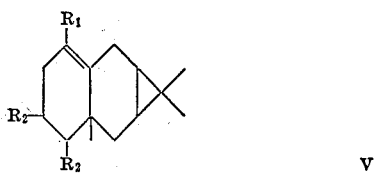

wherein $R_1$, $R_2$ and $R_3$ have the above significance, in particular compounds of Formulae Va–Vd

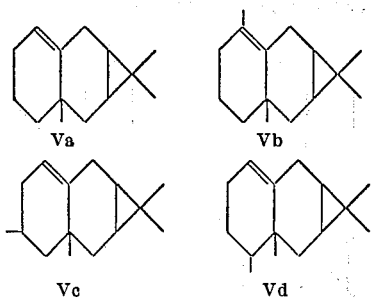

General Formula I above also includes saturated (e) saturated alcohols of general Formula VI

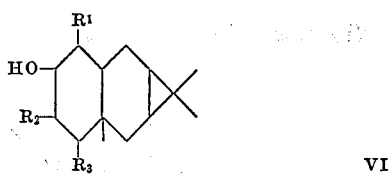

wherein $R_1$, $R_2$ and $R_3$ have the above significance, for example, 4,4,7,8-tetramethyl-tricyclo[5.4.0.0$^{3,5}$]undecan-10-ol, as well as (f) diene-hydrocarbons of general Formula VII

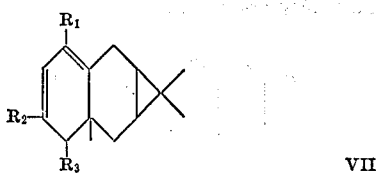

wherein $R_1$, $R_2$ and $R_3$ have the above significance, for example, 4,4,7-trimethyl-tricyclo[5.4.0.0$^{3,5}$]undeca-9,11-diene.

Furthermore, Formula I includes compounds in which the alcoholic hydroxyl group of the compounds of general Formulae IV and VI is esterified with a lower alkane-carboxylic acid, preferably containing 1–4 C-atoms, such as acetic acid. An example of such an ester is the acetate of the alcohol IVa.

The present formulae are meant to include both structurally uniform compounds and also stereoisomeric mixtures. These mixtures are caused by the possibility of a different linkage of the rings or the different spatial arrangement of the alkyl substituents or of the functional groups in the cyclic system. Thus, on hydrogenation of the double bond, from the uniform ketone IIa there can theoretically result two different substances IIIa$_1$ and IIIa$_2$, depending on whether the hydrogen attacks from the α- or β-side of the molecule:

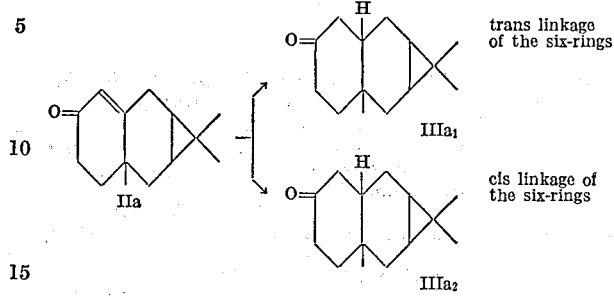

With an additional alkyl-substitution in the left-hand ring, further isomers result from the arrangement to one another of the alkyl groups, for example

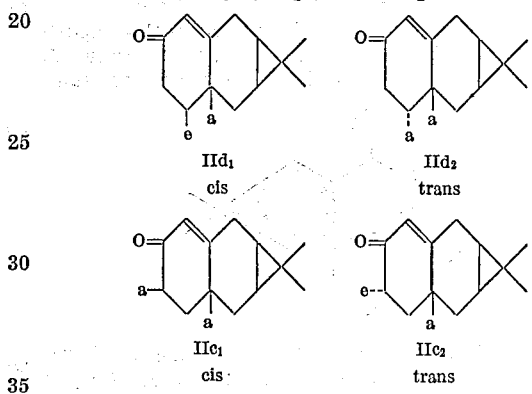

where e-equatorial and a-axial.

Another example is the reduction at the carbonyl group. It can lead to an equatorial or axial arrangement of the hydroxyl:

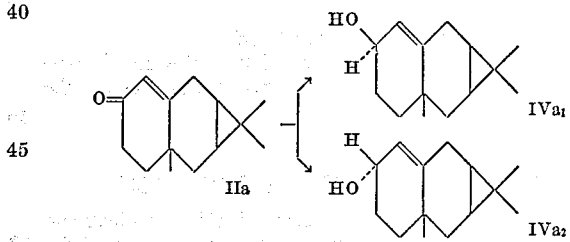

The α,β-unsaturated ketones of general Formula II can be manufactured by reacting an α,β-unsaturated ketone of the general formula

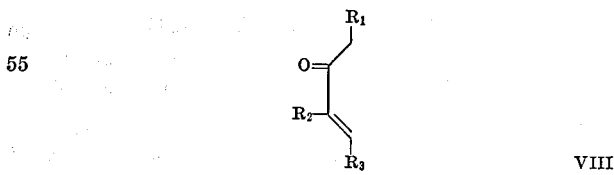

wherein $R_1$, $R_2$ and $R_3$ have the above significance, with 3-caranone of the formula

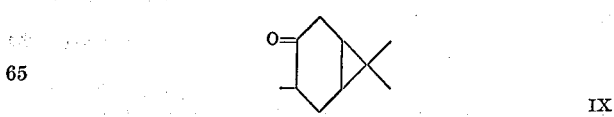

This reaction can be effected according to the usual methods of the Michael addition in the presence of an alkaline condensation agent at temperatures between about 0° and 10° C. and preferably using a solvent. As alkaline condensation agents there come into consideration, for example, potassium hydroxide in methanolic solution, sodium methylate, sodium ethylate or sodium amide. Suitable solvents are, for example, diethyl ether or ethanol. After working up by distillation in vacuum, the ketones II are obtained in yields between about 45–75% of the theory. The yields generally lie higher when an excess between 25–100% of the acceptor is worked with. The 3-caranone of Formula IX can be produced readily and with good yields from $\Delta^3$-carene.

The corresponding saturated ketones of general Formula III can be obtained from the unsaturated ketones of general Formula II by catalytic hydrogenation. The hydrogenation is conveniently effected under atmospheric pressure and at room temperature. Suitable as the catalyst is, for example, palladium (for example, 5% Pd/C). Suitable solvents are, for example, methanol, ethanol, hexane.

The unsaturated alcohols of general Formula IV may be obtained from the unsaturated ketones of general Formula II by reduction of the carbonyl group to the secondary alcohol group. The reduction can, for example, be carried out with lithium aluminum hydride in boiling diethyl ether.

The carbonyl group of the saturated ketones III can also be reduced to the secondary alcohol group in an analogous manner. Saturated alcohols of general Formula VI, for example 4,4,7-trimethyl-tricyclo[5.4.0.0$^{3,5}$]-undecan-10-ol, are thus obtained.

The alcohols IV and VI may be esterified in the usual manner with a lower alkanecarboxylic acid or a reactive derivative of such an acid, for example by heating with the corresponding acid anhydride (e.g. acetic anhydride) in the presence of pyridine.

The diene-hydrocarbons of general Formula VII can be obtained from the unsaturated alcohols IV by dehydration. Suitable as dehydrating agents are, for example, mineral acids such as sulphuric acid or strong organic acids such as p-toluenesulphonic acid. As a rule, it is sufficient to heat the solution (e.g. in benzene) of the alcohol IV which is to be dehydrated with a trace of the acid, the water formed conveniently being continuously removed.

The unsaturated hydrocarbons of general Formula V can be obtained from the unsaturated ketones of general Formula II by reduction of the carbonyl group, for example according to the process of Huang-Minlon [J. Amer. Chem. Soc. 68, 2487 (1946)]. In so doing, the ketone II is conveniently treated with hydrazine hydrate in the form of its 85% aqueous solution, powdered potassium hydroxide and triethyleneglycol and the reaction mixture heated at temperatures of about 200° C. until nitrogen evolution is completed. For the working up, the reaction mixture is treated with water, extracted with ether, the ethereal solution washed neutral, dried and concentrated. After distillation of the residue in vacuum, the hydrocarbon V is obtained in yields between about 55–62% (stereoisomer-mixture).

The compounds of general Formula I, especially the unsaturated ketones II, the saturated ketones III, the unsaturated alcohols IV and the unsaturated hydrocarbons V, possess perfumistically valuable properties, on the basis of which they can be used in the odorant industry as odorants and/or fixatives; for example, in odorant compositions such as perfumes or concentrates for perfuming alcoholic solutions, soaps, solid and liquid detergents, aerosols, cosmetic products of all types such as salves, face milks, makeups, bath salts and bath oils.

The ketones IIa–IIe have pleasantly woody odour notes with good adhesion which to some extent are reminiscent of vetiver oil and sandalwood.

In the case of the saturated ketones IIIa–IIId, the woody note is throughout somewhat weakened.

The unsaturated alcohols IVa–IVd again exhibit sandalwood-like odour notes and good fixing properties which come in very useful for use in perfumery.

Peculiar to the unsaturated hydrocarbons Va–Vd is a balsamic, earthy-spicy odour note which harmonizes well with woody, mossy odours.

As will be understood by those skilled in the art, no hard and fast rules can be given for using the novel compounds of this invention to secure olfactorily-effective results. This is so, mainly on account of the varying amounts of perfume ingredients in the various end products in which they are employed, as well as on the particular desires and objective of each perfumer. As a general guide, amounts of the novel compounds of this invention from about 2 to 10% by weight, based on the weight of the perfume composition may be used, though smaller or greater amounts can be used, if desired. Thus, e.g. about 1 percent by weight is normally sufficient in detergents and cologne water; whereas as much as 20% may be used in alcoholic solutions.

Examples of odorant compositions with a content of one or more compounds of general Formula I are:

| Eau de Cologne: | Parts by weight |
|---|---|
| Oil of bergamot | 250 |
| Oil of orange | 60 |
| Oil of lemon | 100 |
| Neroli synth. | 40 |
| Oil of lavender | 50 |
| Isomethylionone alpha | 30 |
| Methanol | 20 |
| Eugenol | 20 |
| Maderiax | 50 |
| Cedryl acetate cryst. | 40 |
| Vetiveryl acetate | 30 |
| Vetiver oil Bourbon | 10 |
| Musk ambrette | 10 |
| Mousse de Chene (oak moss) | 20 |
| Sauge sclarée (muscatel sage) | 10 |
| Ceylon cinnamon oil 10% | 10 |
| Coumarin | 10 |
| Undecylenaldehyde 10% | 10 |
| Methylnonylacetaldehyde extra 10% | 10 |
| Oil of coriander | 5 |
| Galbanum oil | 5 |
| Oil of estragon | 5 |
| Oil of basil | 5 |
| 4,4,7,9 - tetramethyl-tricyclo[5.4.0.0$^{3,5}$]-undec-11-en-10-ol [IVc] | 30 |
| 4,4,7,8 - tetramethyl-tricyclo[5.4.0.0$^{3,5}$]-undec-11-en-10-one (IId) | 75 |
| Diethyleneglycol monoethyl ether | 95 |
| | 1000 |

| Composition with forest odour | Parts by weight |
|---|---|
| Spruce-needle oil (Siberian) | 150 |
| Silver fir-needle oil | 150 |
| Isobornyl acetate liq. | 250 |
| Spruce-needle oil (absolute) | 30 |
| Gamma-musk | 30 |
| Betaionone | 20 |
| Vetiver oil Bourbon 50% | 10 |
| Oil of patchouly 10% | 40 |
| 4,4,7,9 - tetramethyl-tricyclo[5.4.0.0$^{3,5}$]-undec-9-ene (Vc) | 50 |
| Methylnonylacetaldehyde extra 10% | 20 |
| Nerones | 10 |
| Hydratropaldehyde dimethyl acetal | 10 |
| Terpineol | 50 |
| Linalyl acetate | 30 |
| Diethyleneglycol monoethyl ether | 150 |
| | 1000 |

In the following examples, the temperatures are stated in degrees centigrade.

Example 1

20 g. of 3-caranone dissolved in 25 ml. of ethanol are added to a solution of 0.6 g. of sodium in 25 ml. of absolute ethyl alcohol. The solution of 18.7 g. of methyl vinyl ketone in 25 ml. of ethanol is subsequently added dropwise with stirring in the course of an hour at room temperature and under $N_2$-gassing. The stirring at ca. 25° is continued overnight and the dark-coloured solution is then heated to boiling for a further 2 hours. The reaction mixture is poured onto ice, extracted with ether, the ethereal solution washed neutral, dried and concentrated. The residue (35 g.) is distilled at 138–140° and 0.03 mm. Hg. There are thus obtained 21.3 g. (79%) of 4,4,7-trimethyl-tricyclo[5.4.0.0$^{3,5}$]-undec-11-en-10-one (IIa) of M.P. 103–104° (from pentane). UV: $\lambda_{max.}$ 240 m$\mu$, $\epsilon$=16700. Odour: green, slightly woody.

Example 2

20 g. of 3-caranone are added to a sodium ethylate solution freshly prepared from 0.61 g. of sodium and 25 ml. of absolute ethanol. The solution of 12.25 g. of ethyl vinyl ketone in 25 ml. of ethanol is added dropwise in the course of an hour with stirring, $N_2$-gassing and slight external cooling at 18 to 20° and the reaction mixture is stirred overnight at room temperature. It is subsequently boiled at reflux for 2.5 hours and worked up as in Example 1. There is thus obtained 4,4,7,11-tetramethyl-tricyclo[5.4.0.0$^{3,5}$]-undec-11-en-10-one (IIb), M.P. 74–75°. Yield 73%. UV: $\lambda_{max.}$ 249 m$\mu$, $\epsilon$=14900. Odour: Interesting wood note, harmonising well with cedar and sandalwood oils.

Example 3

A sodium ethylate solution is prepared from 0.305 g. of sodium and 12.5 ml. of absolute ethanol. After the addition of 10 g. of 3-caranone, the solution of 10.9 g. of isopropenyl methyl ketone (3-methyl-3-buten-2-one) in 25 ml. of ethanol is added dropwise in the course of 45 minutes with stirring, $N_2$-gassing and maintenance of a temperature of 10 to 15°. The mixture is stirred overnight at room temperature and then boiled at reflux for a further 1 hour. The further working up is effected as described in Example 1. There is thus obtained 4,4,7,9-tetramethyl-tricyclo[5.4.0.0$^{3,5}$]-undec-11-en-10-one (IIc) of B.P. 93°/0.06 mm.; M.P. 63°; UV:$\lambda_{max}$ 241.5 m$\mu$, $\epsilon$=13800; yield: 75%. Odour: woody, spicy.

Example 4

8.5 g. of 3-caranone are added to a freshly prepared solution of 0.2 g. of sodium in 10 ml. of absolute ethanol. After heating to 30°, 3.7 g. of 3-penten-2-one are added dropwise in the course of 15 minutes with stirring and $N_2$-gassing. The mixture is subsequently boiled at reflux for a further 3 hours and the dark reaction product worked up as described in Example 11. There is thus obtained 4,4,7,8-tetramethyl-tricyclo[5.4.0.0$^{3,5}$]-undec-11-en-10-one (IId) (mixture of two stereoisomers) of B.P. 130–135°/0.07 mm.; $n_D^{20}$ 1.5228; UV$\lambda_{max}$ 242 m$\mu$, $\epsilon$=11600; yield: 45%. The main component can be isolated in pure form after gas-chromatographic purification. M.P. 76–78°.

Example 5

2.04 g. of 4,4,7-trimethyl-tricyclo[5.4.0.0$^{3,5}$]-undec-11-en-10-one (IIa) are dissolved in 20 ml. of ethyl alcohol, treated with 0.5 g. of a 5% palladium/carbon catalyst and hydrogenated in a shaking apparatus at room temperature and normal pressure up to the uptake of 1 mol equivalent of hydrogen. The catalyst is filtered off, the solution concentrated, the residue taken up in ether and once more filtered. After evaporation of the solvent, 2 g. of 4,4,7-trimethyl-tricyclo[5.4.0.0$^{3,5}$]-undecan-10-one (IIIa) remain in the form of snow-white crystals of M.P. 76°. Yield: 87%.

Example 6

0.75 g. of 4,4,7,11-tetramethyl-tricyclo[5.4.0.0$^{3,5}$]-undec-11-en-10-one in 10 ml. of ethanol are hydrogenated in the presence of 0.3 g. of a 5% palladium/carbon catalyst under the same conditions as in Example 5. The liquid hydrogenation product is distilled in the bulb-tube and has the IR bands at 1712, 1453, 1374 and 1144 cm.$^{-1}$ typical for the saturated ketone IIIb (4,4,7,11-tetramethyl-tricyclo[5.4.0.0$^{3,5}$]-undecan-10-one). The NMR spectrum displays signals at 0.88 (S, 3H) and 1.13 (D, 3H, J=7.5 cps.) p.p.m.

Example 7

4.5 g. of 4,4,7,9-tetramethyl-tricyclo[5.4.0.0$^{3,5}$]-undec-11-en-10-one are dissolved in 15 ml. of methanol and hydrogenated at room temperature and normal pressure in the presence of 0.5 g. of a 5% palladium/carbon catalyst up to the uptake of 500 ml. of hydrogen. After working up as in Example 5, the crude hydrogenation product IIIc (4,4,7,9-tetramethyl-tricyclo[5.4.0.0$^{3,5}$]-undecan-10-one) is distilled in vacuum. B.P. 98°/0.07 mm.; $n_D^{20}$ 1.4976–1.4980 (two stereoisomers in the ratio of ca. 85:15) IR: 1712, 1453, 1377, 1141 cm.$^{-1}$.

Example 8

The solution of 9.9 g. of 4,4,7,8-tetramethyl-tricyclo-[5.4.0.0$^{3,5}$]-undec-11-en-10-one in 40 ml. of ethanol is exhaustively hydrogenated in the presence of 1 g. of a 5% palladium/carbon catalyst [1070 ml of $H_2$ taken up=95% of the theoretical amount]. The residue [10 g.], worked up as described in Example 5, is chromatographed on the 50-fold amount of silicagel using benzene with increasing amounts of diethyl ether as the eluant. It is thus possible to enrich or to isolate in pure form the two main components of IIId (4,4,7,8-tetramethyl-tricyclo[5.4.0.0$^{3,5}$]-undecan-10-one). M.P. 85–86° or B.P. 93–95°/0.1 mm., $n_D^{20}$ 1.5034 for ca. 88% product.

Example 9

A suspension of 0.1 g. of $LiAlH_4$ in 5 ml. of absolute ether is heated up to incipient reflux. The solution of 2.04 g. of 4,47-trimethyl-tricyclo[5.4.0.0$^{3,5}$]-undec-en-10-one (IIa) in 10 ml. of ether is then added dropwise with stirring and nitrogen gassing in the course of 20 minutes and the reaction mixture is boiled at reflux for a further 4 hours. After cooling, the mixture is cautiously decomposed with Rochelle salt solution under neutral conditions, extracted with ether, the ethereal solution washed with water, dried and concentrated. The remaining residue [2 g.] containing 4,4,7 - trimethyl-tricyclo[5.4.0.0$^{3,5}$]-undec-11-en-10-ol (IVa) displays 2 spots ($R_f$=0.25 and 0.32) in the thin layer chromatogram with benzene:methanol [9:1] and exhibits the following bands in the IR spectrum: 3289, 1661, 1449, 1374, 1029, 1008, 992 cm.$^{-1}$. The product is free from carbonyl groups and conjuated systems.

Example 10

2.18 g. of 4,4,7,11-tetramethyl-tricyclo[5.4.0.0$^{3,5}$]-undec-11-en-10-one (IIb) in 10 ml. of absolute ether are added dropwise with stirring and nitrogen gassing within 20 minutes at the boiling temperature of the ether to the suspension of 0.1 g. of $LiAlH_4$ in 5 ml. of absolute ether. After boiling for four hours at reflux, the mixture is worked up as described in Example 9. In the thin layer chromatogram, the viscous reduction product possesses 2 spots lying close to one another [$R_f$=0.32 and 0.39, eluent benzene:methanol [9:1]] and displays the following bands in the IR spectrum: 3311, 1661, 1014 cm.$^{-1}$. The odour of the 4,4,7,11-tretramethyl-tricyclo[5.4.0.0$^{3,5}$]-undec-11-en-10-ol (IVb) is pleasantly woody and very well adherent.

Example 11

2.18 g. of 4,4,7,9-tetramethyl-tricyclo[5.4.0.0$^{3,5}$]-undec-11-en-10-one (IIc) are reduced to the corresponding alcohol with $LiAlH_4$ as described in Example 10. Thin layer chromatography: $R_f$=0.40 and 0.51; IR: 3289, 1640, 1028, 1012, 990, 880, 814 cm.$^{-1}$. Column chromatographic purification on the 30-fold amount of silicagel [benzene:ether 8:2] leads to the isolation of the crystallised alcohol 4,4,7,9-tetramethyl-tricyclo-[5.4.0.0$^{3,5}$]-undec-11-en-10-ol (VIc) of M.P. 85°. Odour: woody, very well compatible with other wood notes and very well adherent.

Example 12

2.18 g. of 4,4,7,8-tetramethyl-tricyclo[5.4.0.0$^{3,5}$]-undec-11-en-10-one (IId) are dissolved in 10 ml. of absolute ether and added dropwise at the boiling temperature of the ether to the suspension of 0.11 g. of LiAlH$_4$ in 5 ml. of absolute ether. After 4 hours boiling at reflux, the mixture is cooled and worked up with aqueous Rochelle salt solution. After extraction with ether, washing and drying of the ethereal solution and evaporation of the solvent, there remains an initially viscous residue which partially crystallizes (2.2 g., thin layer chromatogram: 2 spots with R$_f$=0.24 and 0.35, benzene/methanol [9:1], IR: 3289, 1661, 1453, 1374, 1050, 1024 and 1004 cm.$^{-1}$). The odour of the 4,4,7,8-tetramethyl-tricyclo[5.4.0.0$^{3,5}$]-undec-11-en-10-ol (IVd) thus obtained is woody and very well adherent.

Example 13

The mixture of 2.04 g. of 4,4,7 - trimethyl - tricyclo-[5.4.0.0$^{3,5}$]-undec-11-en-10-one, 1.5 g. of 85% hydrazine hydrate and 2.24 g. of potassium hydroxide in 20 ml. of triethyleneglycol is heated to 137° and held at this temperature for 2 hours. After attaching a Vigreux column, the flask-temperature is gradually increased to 200°. On reaching 155°, there already begins nitrogen evolution which has ceased after 4 hours. The reaction mixture is cooled, diluted with water and extracted with ether. The ethereal solution is washed neutral with 2 N hydrochloric acid and water, dried and concentrated. The residue [1.7 g., B.P. 59–63°/0.1 mm.; n$_D^{20}$ 1.5032–1.5036] no longer displays carbonyl bands in the IR spectrum and contains a main product with 2 impurities. The main product (4,4,7 - trimethyl-tricyclo[5.4.0.0$^{3,5}$]-undec-11-ene) (Va) is isolated by means of preparative gas chromatography [n$_D^{20}$ 1.5021].

Example 14

2.18 g. of 4,4,7,11 - tetramethyl - tricyclo[5.4.0.0$^{3,5}$]-undec-11-en-10-one are boiled at reflux for 2 hours with 1.5 g. of 85% hydrazine hydrate and 2.24 g. of potassium hydroxide in 20 ml. of triethyleneglycol. The temperature is subsequently gradually increased up to 230°, 1 ml. of distillate being collected. Nitrogen evolution has ended after 1.5 hours. The reaction mixture is worked up as in Example 13 and, after distillation [125–127°/12 mm.; n$_D^{20}$ 1.4995] and gas chromatographic purification, yields a stereoisomer-pair of 4,4,7,11 - tetramethyl - tricyclo-[5.4.0.0$^{3,5}$]-undec-11-ene in the ratio of ca. 1.5:1.

Example 15

2.18 g. of 4,4,7,9 - tetramethyl - tricyclo - [5.4.0.0$^{3,5}$]-undec-11-en-10-one are reduced at the carbonyl group as described in Example 13. The residue [2 g.] remaining after distilling off the solvent yields 1.25 g. of distillate (B.P. 100°/0.1 mm.; n$_D^{20}$ 1.4995; main product 4,4,7,9-tetramethyl - tricyclo[5.4.0.0$^{3,5}$] - undec-11-ene (Vc) ca. 80%. NMR: 0.89 [D]; 0.91 [S] together 6H; 1.00 and 1.04 [S, 6H]; 5.40 [D, 1H] p.p.m.).

Example 16

2.18 g. of 4,4,7,8-tetramethyl-tricyclo[5.4.0.0$^{3,5}$]-undec-11-en-10-one are reduced at the carbonyl group as described in Example 13. After working up, there remain 1.6 g. of residue which are purified by distillation. The 4,4,7,8-tetramethyl-tricyclo[5.4.0.0$^{3,5}$]-undec-11-ene (Vd) thus obtained has a B.P. of 127°/12 mm.; n$_D^{20}$ 1.5060.

Example 17

8.6 g. of the alcohol IVa described in Example 9 are boiled at reflux for 3 hours with the exclusion of moisture with 4.6 g. of freshly distilled acetic acid anhydride and 7.1 g. of absolute pyridine. The mixture is subsequently cooled, poured into ice-water and exhaustively extracted with ether. The ethereal solution is first washed pyridine-free with 10% hydrochloric acid and subsequently washed neutral with water, sodium hydrogen carbonate solution and water. The residue [10 g.] remaining after drying and concentration of the ethereal solution exhibits the following bands in the IR spectrum: 1730, 1667, 1374, 1359, 1247, 1020 and 809 cm.$^{-1}$.

The crude acetate of 4,4,7-trimethyl-tricyclo-[5.4.0.0$^{3,5}$] undec - 11 - en - 10 - ol thus obtained is distilled in high vacuum. B.P. ca. 120°/0.05 mm.; n$_D^{20}$ 1.5062.

Example 18

5.9 g. of 4,4,7-trimethyl-tricyclo[5.4.0.0$^{3,5}$]-undec-11-en-10-ol (IVa) are boiled at the water-separator with a trace of mineral acid (or p-toluenesulphonic acid) and 50 ml. of benzene. After completed removal of water, the solvent is taken off in vacuum and the residue fractionally distilled. 4,4,7 - trimethyl-tricyclo[5.4.0.0$^{3,5}$]-undeca-9,11-diene (VII: R$_1$, R$_2$, R$_3$=H) of B.P. 107–108°/12 mm. is thus obtained; n$_D^{20}$ 1.5151 . . . 59, purity ca. 85%; UV: λ$_{max}$. 262 mµ, ε=4420; IR: 1645, 1587, 1374 and 1366 cm.$^{-1}$.

Example 19

2.6 g. of 4,4,7,8 - tetramethyl - tricyclo[5.4.0.0$^{3,5}$] - undecan-10-one (IIId) are dissolved in 15 ml. of absolute ether and added dropwise in the course of 30 minutes to the boiling suspension of 0.12 g. of LiAlH$_4$ in 5 ml. of absolute ether. The mixture is subsequently boiled at reflux for a further 4 hours and then, after cooling, worked up with aqueous Rochelle salt solution. The reaction product is taken up in ether, the ethereal solution washed, dried and concentrated. In the thin layer chromatogram (benzene:methanol 9:1), the residue exhibits two spots with R$_f$=0.25 or 0.53 and, according to the IR spectrum, is carbonyl-free [bands at 3289, 1458, 1374, 1121 and 1035 cm.$^{-1}$]. By chromatography on 96 g. of aluminum oxide (neutral, act. grade I), the main component (4,4,7,8-tetra-methyl-tricyclo-[5.4.0.0$^{3,5}$]-undecan-10-ol) may be isolated in pure form [1.85 g., n$_D^{20}$ 1.5078].

Example 20

0.305 g. of metallic sodium was added to 12.4 ml. of absolute ethanol. After evolution of hydrogen ceased, 10.0 g. of 3-caranone was added to the resulting solution. A solution of 6 g. of 2-methyl-1-penten-3-one in 10 ml. of benzene was then added, dropwise, with stirring and N$_2$-gassing, (i.e., in a nitrogen atmosphere) at room temperature during a period of 20 minutes. Stirring was continued overnight at room temperature and the reaction mixture was heated to boiling for a further 2 hours the next morning.

After the reaction mixture was poured onto crushed ice it was extracted with ether, the ethereal solution was washed neutral, dried and the ether was removed. The residue was fractionally distilled. After a forerun of unreacted 3-caranone, there was obtained, 4,4,7,9,11-pentamethyl-tricyclo[5.4.0.0$^{3,5}$]-under-11-en-10-one, IIe, boiling at 80° C./0.1 mm.

The ketone obtained in accordance with this example [n$_D^{20}$ 1.5168, UV λ$_{max}$. 25 mµ, ε=12100], when examined organoleptically on a smelling blotter, initially possesses a green-herbaceous odor reminiscent of oil of fern, but after a few days takes on a strong, woody character having a nootkaton nuance.

The compounds prepared in accordance with each of the foregoing examples may be used, per se or in admixture, including admixture with other olefactorily-desirable perfume agents, in accordance with the foregoing teachings, to prepare alcoholic solutions, soaps, detergents, aerosols, cosmetic preparations, as well as other products hereinbefore mentioned, and others.

The foregoing illustrates the practice of this invention, which, however, is not to be limited thereby but is to be construed as broadly as permissible in view of the prior art and limited solely by the appended claims.

We claim:
1. A compound having the formula:

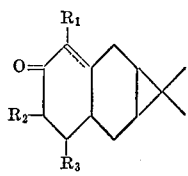

wherein $R_1$, $R_2$ and $R_3$ represent hydrogen atoms or lower alkyl groups and ⁐ signifies a C—C single or double bond.
wherein $R_1$, $R_2$ and $R_3$ signify hydrogen atoms or lower alkyl groups.

4. A compound in accordance with claim 3, wherein $R_1$, $R_2$ and $R_3$ are all H.

5. A compound in accordance with claim 3, wherein $R_1$ is $CH_3$ and $R_2$ and $R_3$ are each H.

6. A compound in accordance with claim 3, wherein $R_1$ and $R_3$ are H and $R_2$ is $CH_3$.

7. A compound in accordance with claim 3, wherein $R_1$ and $R_2$ are each H and $R_3$ is $CH_3$.

2. A compound in accordance with claim 1, wherein two of $R_1$ $R_2$ and $R_3$ signify a hydrogen atom and the third represents a lower alkyl group.

3. A compound in accordance with claim 1, having the formula:

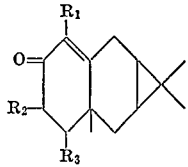

8. A compound in accordance with claim 3, wherein $R_1$ and $R_2$ are each $CH_3$ and $R_3$ is H.

9. A compound in accordance with claim 1, wherein said compound has the formula:

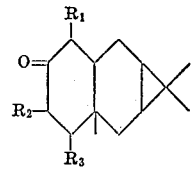

wherein $R_1$, $R_2$ and $R_3$ signify hydrogen atoms or lower alkyl groups.

10. A compound in accordance with claim 9, wherein $R_1$, $R_2$ and $R_3$ are all H.

11. A compound in accordance with claim 9, wherein $R_1$ is $CH_3$ and $R_2$ and $R_3$ are each H.

12. A compound in accordance with claim 9, wherein $R_1$ and $R_3$ are each H and $R_2$ is $CH_3$.

13. A compound in accordance with claim 9, wherein $R_1$ and $R_2$ are each H and $R_3$ is $CH_3$.

References Cited

UNITED STATES PATENTS 2,671,808   3/1954   Johnston et al. ____ 260—586 R

OTHER REFERENCES

Buechi et al. "Chem. Abstracts," vol. 58, pp. 1498–1499, (1963).

BERNARD HELFIN, Primary Examiner

N. MORGENSTERN, Assistant Examiner

U.S. Cl. X.R.

252—522, Dig. 5, Dig. 14; 260—488 B, 617 F, 666 P Y